United States Patent [19]

Carlson

[11] Patent Number: 5,313,980
[45] Date of Patent: May 24, 1994

[54] METHOD OF AND VALVE FOR CONTROLLING FLOW IN A HYDRONIC SYSTEM

[76] Inventor: Bengt A. Carlson, 377 Glenbrook Rd., Unit 7, Stamford, Conn. 06906

[21] Appl. No.: 43,831

[22] Filed: Apr. 6, 1993

[51] Int. Cl.⁵ .................................................. F16K 37/00
[52] U.S. Cl. ..................................... 137/557; 73/201; 73/861.65; 251/288
[58] Field of Search ............................. 73/201, 861.65; 137/557; 251/288

[56] References Cited

U.S. PATENT DOCUMENTS

| | | |
|---|---|---|
| 3,086,548 | 4/1963 | Galiger . |
| 3,355,946 | 12/1967 | Lazell ............................. 73/861.65 |
| 3,537,473 | 11/1970 | Dezurik ........................... 251/288 X |
| 4,672,728 | 6/1987 | Nimberger ........................ 73/201 X |
| 4,959,990 | 10/1990 | Morris . |

OTHER PUBLICATIONS

Bell & Gossett ITT; "A Great Idea Just Got Better" IT-8021 1 page. (undated).
Midwest-West Instrument; Delta Tube "The Averaging Pitot System With Minimum Pressure Drop and Best . . . "; Bulletin No DT-GPB/91, 2 pages (undated).
Armstrong—File No. 5036115/1 Feb. 90; "Circuit Balancing Valves" 6 pages (undated).
Gerand Engineering Co.—Bulletin-100 Apr. 1, 1985; "For Accurately Indicating Flowrated in Hydronic Systems"; 5 pages (undated).
MNG—Technical information—16 bars (230) p.s.i.; "Kombill" Balancing, contrl and shut-off valve with PTFE disc. 6 pages (undated).

*Primary Examiner*—Robert G. Nilson
*Attorney, Agent, or Firm*—Herbert Dubno; Andrew Wilford

[57] ABSTRACT

Liquid flow through a conduit in a branch of a hydronic system provided with a balancing valve and, in series therewith, a metering valve to obtain a desired rate of flow in the branch is regulated by positioning immediately adjacent the metering valve in the conduit a pitot having an upstream side directed upstream against a direction of flow through the conduit and a downstream side directed downstream in the flow direction. The metering valve is settable in a plurality of predetermined positions each corresponding to a respective flow cross section through the conduit. A differential pressure meter is connected to both sides of the pitot, the one of the predetermined valve positions is selected that gives a near full-range reading on the meter, and the metering valve is set in this selected one position. The pressure-differential reading on the meter is monitored and the balancing valve is adjusted to regulate flow therethrough until the read pressure corresponds to a level itself corresponding to the desired rate of flow in the branch.

9 Claims, 6 Drawing Sheets

METHOD OF AND VALVE FOR CONTROLLING FLOW IN A HYDRONIC SYSTEM

FIELD OF THE INVENTION

The present invention relates to a hydronic system where a liquid is circulated through a plurality of parallel branches normally for exploitation of the thermal energy of the liquid. More particularly this invention concerns a method of and equipment for adjusting and measuring flow in the branches of such a system.

BACKGROUND OF THE INVENTION

In a complex hydronic system, for instance a building heating system, hot water is pumped from a central boiler up a common riser from which it flows through a multiplicity of branch lines each including one or more terminals. Then the multiple streams are reunited in a common downpipe that leads back to the boiler. In such a system it is necessary to balance the flow in the individual branches. Thus each branch is provided with a balancing valve, which is nothing more than a lockable flow-control valve, that is adjusted until a predetermined flow, normally measured in gallons per minute, is obtained in the branch. In this manner a branch with particularly low resistance to flow does not get too much flow while another with relatively high resistance gets too little.

The standard method for adjusting flow in a branch, typical a radiator or coil, is fairly laborious. A typical-balancing valve (the Bell & Gossett ITT "Circuit Setter Plus," or the "CBV" system of Armstrong Pumps) has a graduated spindle that indicates the valve's flow cross section and its resistance to flow. Immediately upstream and downstream of the valve element of such a valve, the valve housing is provided with closable nipples that open internally into the valve. A differential pressure meter is first connected to these nipples. Then the balancing valve is adjusted to one of a multiplicity of graduated settings and the difference in pressure between the measuring locations upstream and downstream of the valve and the valve setting is noted. These readings are checked on a chart for the particular valve size to ascertain the flow rate in volume per units of time. The chart plots flow against differential pressure and has a large number of lines corresponding to the different settings so that the user checks the line for the setting being used, and determines for the pressure reading the flow. If the ascertained flow rate is not correct the valve is readjusted, a reading is taken again, and the appropriate line on the chart is consulted to get the new flow rate. Thus the balancing valve serves both for balancing and measuring flow. This process is repeated until the desired flow rate is obtained, and the valve is secured in the last position to lock in this flow rate, and a stop is set so that if the balancing valve is subsequently shut, for example for servicing of the associated radiator or chiller, it can be returned to the desired position, typically called the "memory" position.

Obviously this is an extremely laborious procedure involving making two separate connections to the line, and then adjusting the valve while frequently consulting a chart. The person doing this flow balancing must be fairly skilled, and even so the procedure can be very time consuming in a large building that can have hundreds of branches.

Another problem with the known system is that it is relatively inaccurate. The pressure-differential meter must normally be able to read pressure differentials over a relatively wide range. Like all such analog equipment, however, it is typically fairly accurate at one part, typically the high end, of its range but much less so toward the low end. Furthermore the valve positions must be very carefully monitored and the valves must be extremely accurately manufactured to ensure some close correspondence between the readings and the actual values. Thus if the flow in a line is relatively low the technician can be dealing with a combined inaccuracy of 20% or more.

Another problem with the known systems is that connecting the differential pressure meter to the branch is a laborious problem, entailing making two separate connections at two separate locations. There is frequently some leakage, and the taps provided for the differential pressure meter are themselves subject to leakage or vandalism.

OBJECTS OF THE INVENTION

It is therefore an object of the present invention to provide an improved method of adjusting such a branched hydronic system.

Another object is the provision of improved equipment for making the above-described balancing adjustments, in particular a valve facilitating the necessary measurements and equipment for use with this valve.

A further object is to provide improved equipment for connecting a differential pressure meter or the like to a branch conduit or the like.

SUMMARY OF THE INVENTION

Liquid flow through a conduit in a branch of a hydronic system provided with a balancing valve and, in series therewith, a metering valve to obtain a desired rate of flow in the branch is regulated by positioning immediately adjacent the metering valve in the conduit a pitot having an upstream side directed upstream and an oppositely directed downstream side. The metering valve can be set in a plurality of predetermined positions each corresponding to a respective flow cross section of the valve. A differential pressure meter is connected to both sides of the pitot, one of the predetermined valve positions is selected that gives a near full-range reading on the meter, and the metering valve is set in this selected one position. The pressure-differential reading on the meter is monitored and the balancing valve is adjusted to regulate flow therethrough until the read pressure corresponds to a level in turn corresponding to the desired rate of flow in the branch.

While it is known to provide a double-facing pitot in a flow conduit (see the Delta Tube ® system of Mid-West Instrument), it is not known to provide one in a valve in the high-speed flow zones that are created immediately adjacent the valve body both upstream and downstream therefrom. In these zones a high flow rate is created when the valve is partially opened that allows a double-faced pitot to work with a much larger pressure differential than is possible in a region of averaged flow. Thus with the system of this invention one artificially creates a high-speed flow zone that is set to give a near full-range meter reading, and the result is extremely accurate flow monitoring because the meter can work at an accurate portion of its range. Of course, the meter's region of greatest accuracy can be somewhere else than at the top of its range, and in this case of course the metering valve is set to produce a pressure differential in this high-accuracy part of the range. Below, however, it is presumed that the region of highest accuracy is the top of the meter range. Furthermore under circumstances of, for example, very low flow it may be necessary to adjust the metering valve for a lower pressure reading than full-range.

According to the invention a chart is consulted that plots flow rate against differential pressure at a number of different valve settings to determine the flow rate in the branch for the prevailing pressure-differential reading. Since the metering valve is used merely to maximize the reading of the pressure-differential meter, only a handful of such settings are needed, greatly simplifying use of this chart, which is a fairly standard item.

In accordance with this invention the valve has a body defining a longitudinally extending flow passage, a valve element in the body movable through a plurality of positions each corresponding to a different flow cross section of the passage so that in each position of the valve flow is accelerated in zones upstream and downstream of the body in the passage, and a pitot element mounted in the body and extending into one of the zones and having in the one zone an upstream port directed longitudinally in one direction and a downstream port directed longitudinally in an opposite direction. The element is formed with pilot flow passages opening at the ports and having opposite outlet ends. A valve unit associated with the passages selectively blocks flow from the outlet ends. The face is adapted for releasable connection to a differential pressure meter.

The hydronic balancing valve can be a butterfly valve, although a ball or gate valve could also be used according to the invention.

The valve unit includes a valve disk formed with two throughgoing holes and displaceable between a closed position covering and blocking flow from the outlet ends of the pilot passages and an open position with the holes aligned with the outlet ends. Structure is further provided according to the invention for arresting the valve disk in a position with its holes offset from the outlet ends and the valve disk blocking flow from the outlet ends. Other structure on the differential pressure meter releases the lock and permits the disk to be rotated to a position with its holes aligned with the outlet ends.

The lock includes spring-loaded pins seated in the pitot element and normally projecting into the holes of the valve disk. The release structure on the meter includes tubular pins engageable into the holes of the disk with the spring-loaded pins to depress same out of the holes and allow rotation of the disk. Furthermore the pressure meter is provided with a pair of extending headed legs each formed with a groove and the pitot element has a support disk formed with notches through which the headed legs can engage and having an edge engageable in the grooves of the legs when the tubular pins engage the spring-loaded pins. Thus the meter head is simply fitted over the pitot and given a simple twist to simultaneously secure the head in place, open the pitot passages, and connect the conduits of the head to these passages.

The metering valve further has according to the invention a stop system on the valve body engageable with the valve element for locking same in each of its positions. This stop system includes a disk formed with a plurality of throughgoing holes, means for releasably coupling the disk to the valve element for joint pivoting therewith, and a stop screw engageable through any of the holes with the valve body for arresting the disk and, when the valve element is coupled to the disk, for also arresting the valve element. Thus it is a fairly simple process to screw the disk tight once the right setting is determined for metering. The plurality of throughgoing holes limits the number of settings to for example five which can be reproduced with great accuracy. Since this setting will be roughly the same in an installation with many identical flows so, the technician can readily set the metering valves for fast and accurate balancing of the loads.

According to a further feature of this invention, instead of using separate balancing and metering valves, the pitot-equipped valve according to the invention is used for both purposes. Such a valve is provided to one side of the load and the other side need merely have a standard shutoff valve used when servicing the equipment. This method has the advantage of being similar to the known ways of using balancing valves and adjusting procedures, so a direct substitution is possible and a technician familiar with existing equipment does not have to be retrained. It loses some of the accuracy of the two-valve system, but in comparison to conventional balancing valves benefits from the quick connect feature of the meter.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
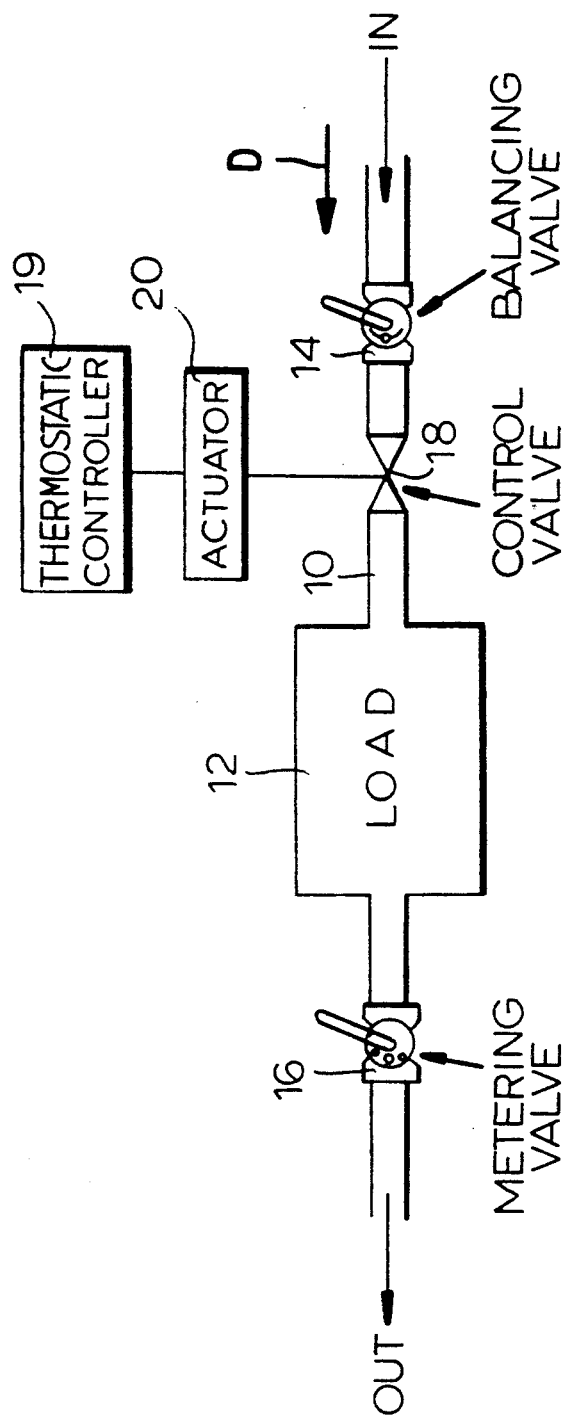
FIG. 1 is a mainly schematic view of the system of this invention.

As seen in FIG. 1 a branch of a hydronic system has a flow pipe 10 through which liquid, normally water, is passed in a direction D to heat or cool a load 12 which may be a radiator, chiller, or some other device using the thermal energy of the liquid. Normally a balancing valve 14 is installed to one side of the load 12 and according to the invention a metering valve 16 is installed to the opposite side so that these two valves 14 and can also serve as shutoff valves to isolate the load 12 when it needs to be serviced. It is also possible to provide a control valve 18 in series with the valves 14 and 16 that is operated by an actuator 20 and thermostatic controller 19. The balancing valve 14 can be a conventional shutoff valve and the maximum flow can be adjusted by restricting the maximum opening of the control valve 18, if desired.

Figure 2:
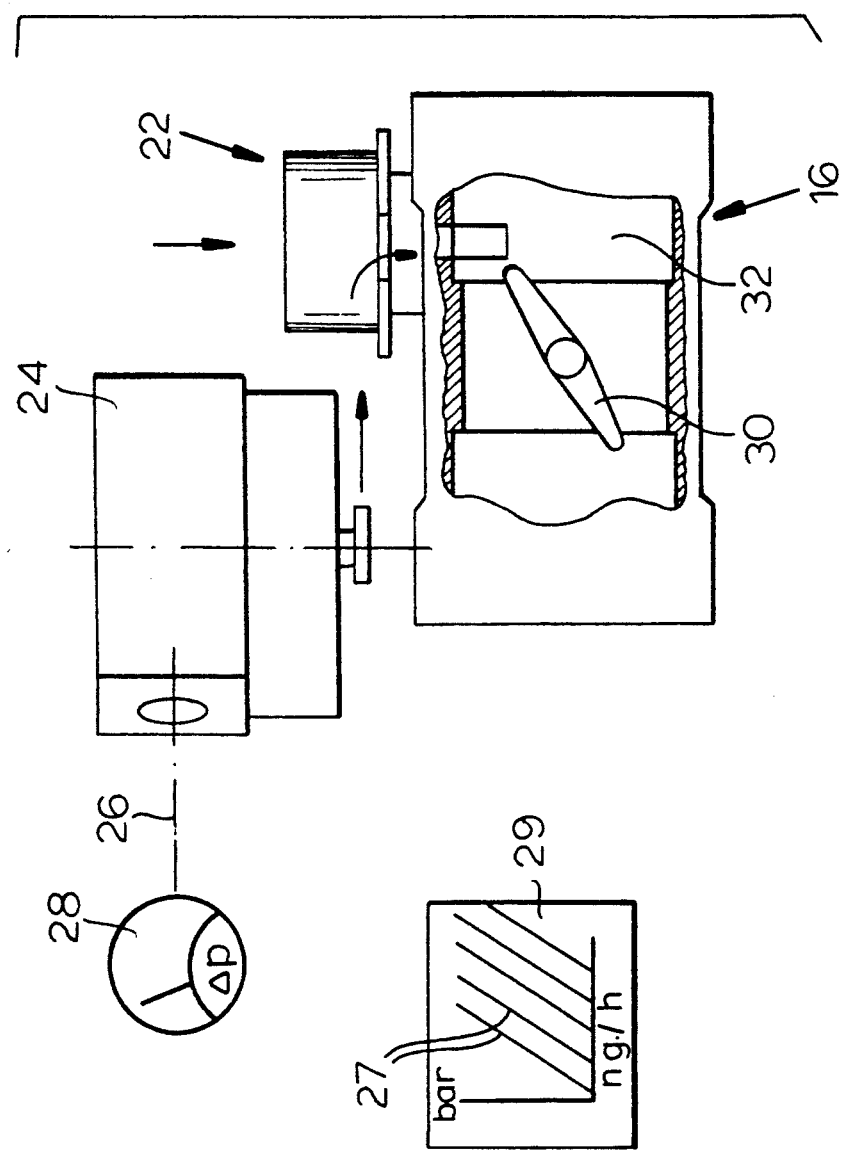
FIG. 2 is a larger-scale and partly schematic view of the system.

FIG. 2 shows how the metering valve 16 according to this invention is provided with a pitot assembly 22 that can be releasably coupled to a connector head 24 (shown disconnected) in turn connected via hoses 26 to a differential pressure meter 28. This pitot assembly 22 detects pressure immediately downstream or upstream of a valve body 30 that is movable in a passage 32 of the valve 16.

In accordance with the method of the invention the meter head 24 is fitted to the pitot assembly 22 when the branch pipe 10 is pressurized and liquid is flowing in it. Then the metering valve 16 is set in any of several, normally five, different positions so as to give a nearly full-scale reading of the meter 28. This position will correspond to a line 27 on a chart 29 that plots flow, normally in gal/min or $m^3/h$, against pressure differential, normally in ft $H_2O$ or bar. Thus the user can read the pressure differential of f the meter 28 and look at the line 27 on the chart 29 corresponding to the valve setting and then easily determine the flow through the valve.

The balancing valve 14 is then adjusted until the meter 28 shows a differential pressure corresponding to the desired flow rate for the branch. Then the balancing valve 14 is normally locked. The metering valve 16 is normally left in its setting.

The control valve 18 can take over the function of the balancing valve, in which case its actuator 20 or controller 19 is then adjusted for the desired open-position setting. In constant flow systems where a three-way control valve is used, two balancing valves 14 are employed, one in the branch through the load and the other in the shunt around the load.

Figure 3:
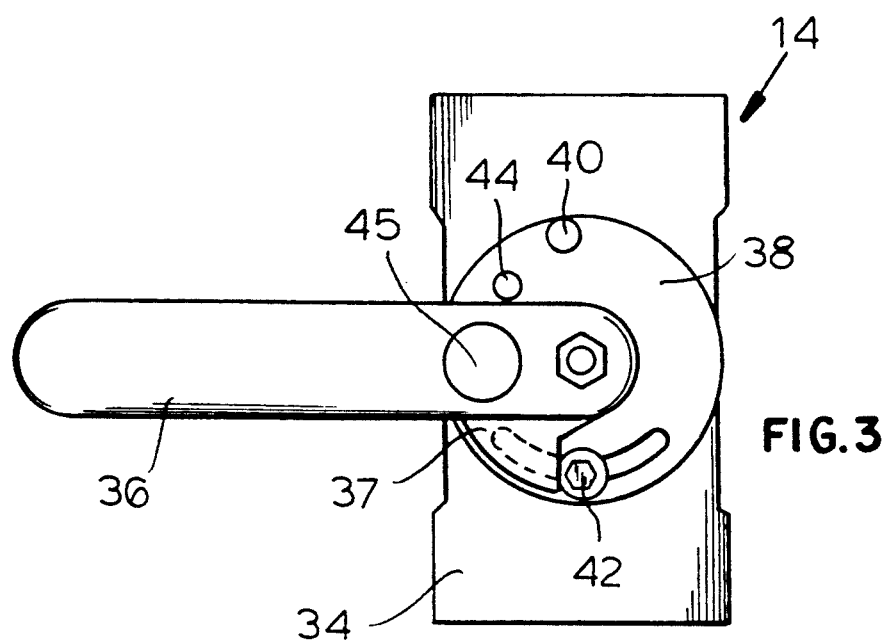
FIG. 3 is a top view of the balancing valve of this invention.
Figure 4:
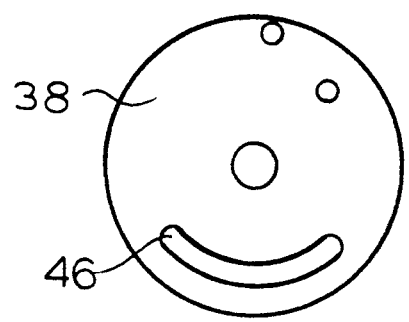
FIG. 4 is a bottom view of the stop plate of the balancing valve of FIG. 3.
Figure 5:
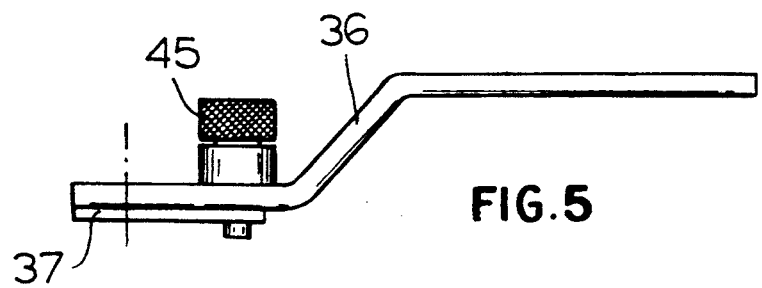
FIG. 5 is a side view of the control handle of the balancing valve of FIG. 3.

FIGS. 3, 4, and 5 show the balancing valve 14 in more detail. It has a housing 34 defining a passage like the passage 32 and a lever 36 that is connected to a butterfly like the butterfly 30 of the metering valve 16. An indexing disk 38 coaxial with the handle 36 carries a stop rivet 40 for the lever 36 and is formed with a throughgoing arcuate slot 46 through which engages a locking screw 42 threaded into the valve body 34. In addition the disk 38 is formed with a hole 44 into which can engage the end of a screw 45 threaded into the lever 36 to lock it in an end position. The lever 36 carries a stop 37 that engages the screw 42 in the full-closed position of the valve 14.

With this system to start with the screw 42 is loose so the disk 38 can rotate on body 34 and the screw 45 is inserted in the hole 44 so that as the handle 36 is turned the disk 38 will rotate with it. When the position for the desired flow rate is set, the screw 42 is tightened. The disk 38 can be locked at any position between 0° and 90°, in what is called the "memory position." If the valve needs to be closed, the screw 48 can then be retracted to allow the valve 14 to be moved between a full-closed position with the handle 36 extending as illustrated perpendicular to longitudinal flow through it and the predefined partially open position engaged against the stop rivet 40. The screw 45 allows the handle 36 to be releasably locked in the partially open position and can be undone by hand without tools since it has a knurled head. The screw 42, which is more critical, must be worked on with tools to loosen it and normally a nonstandard head is provided, for instance a Torx ™ screw head.

Figure 6:
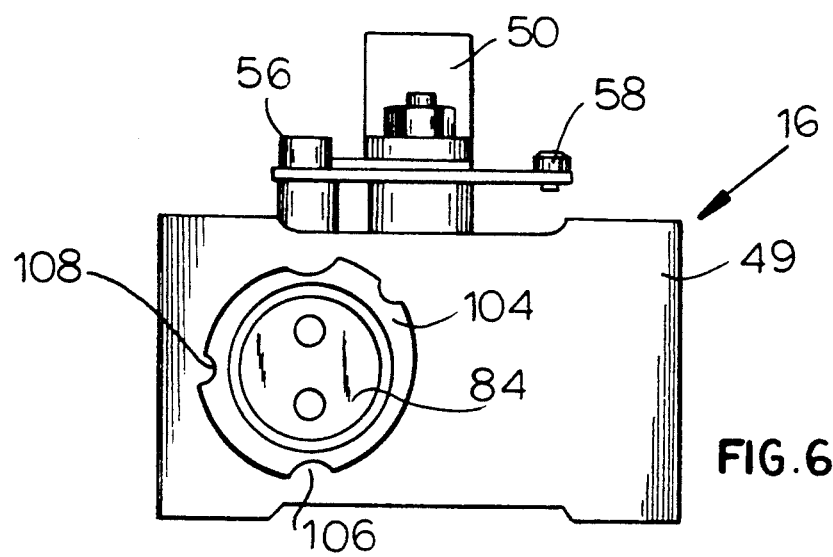
FIG. 6 is a side view of the metering valve of this invention.
Figure 8:
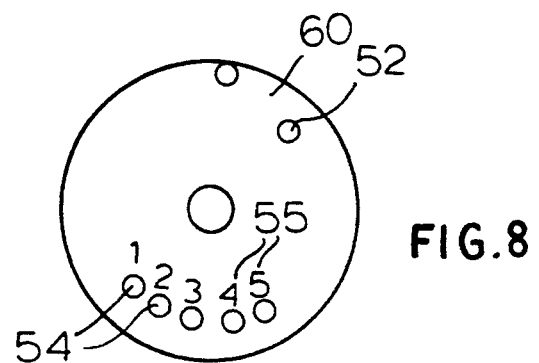
FIG. 8 is a bottom view of the indexing plate of the metering valve of FIG. 7.
Figure 7:
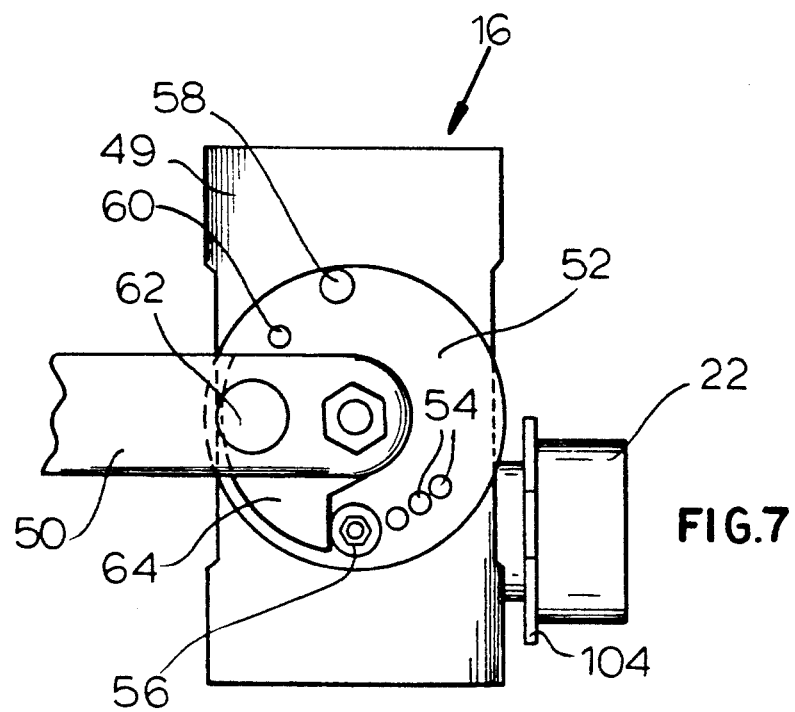
FIG. 7 is a top view of the metering valve of FIG. 6.
Figure 9:
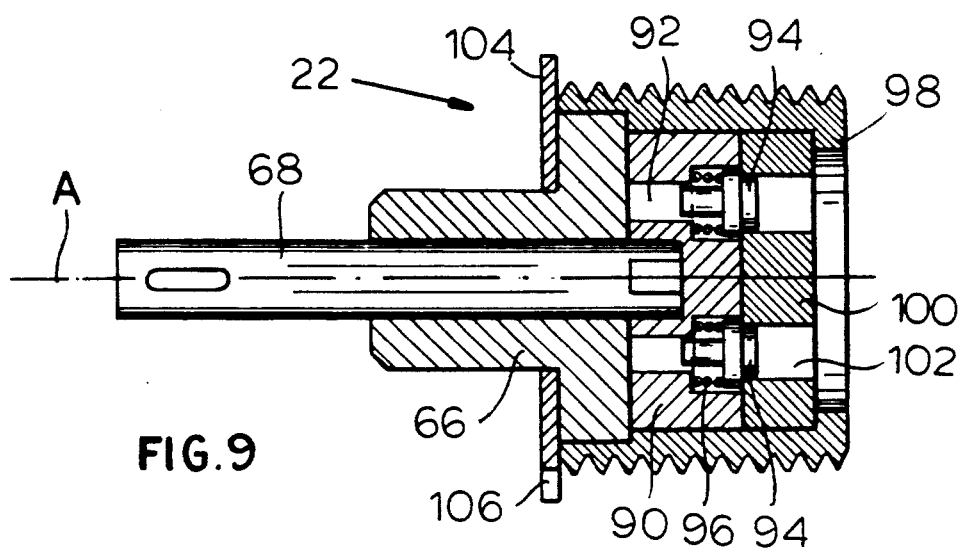
FIG. 9 is a large-scale axial section through the pitot assembly of this invention.
Figure 11:
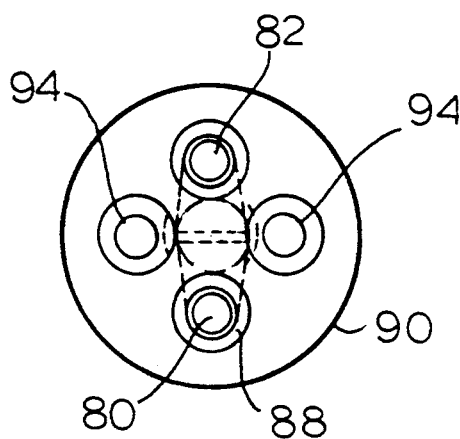
FIG. 11 is an end view of the FIG. 9 assembly.
Figure 10:
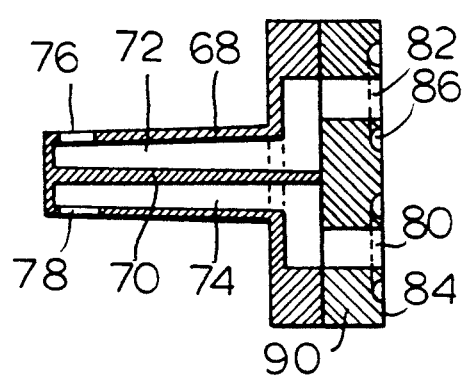
FIG. 10 is an axial section through the tube of the FIG. 9 assembly.
Figure 12:
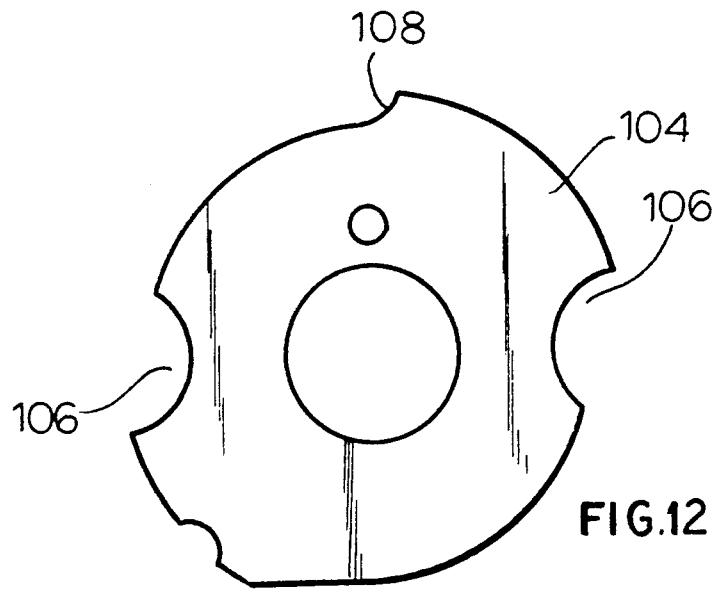
FIG. 12 is an end view of the support plate of the pitot assembly.
Figure 13:
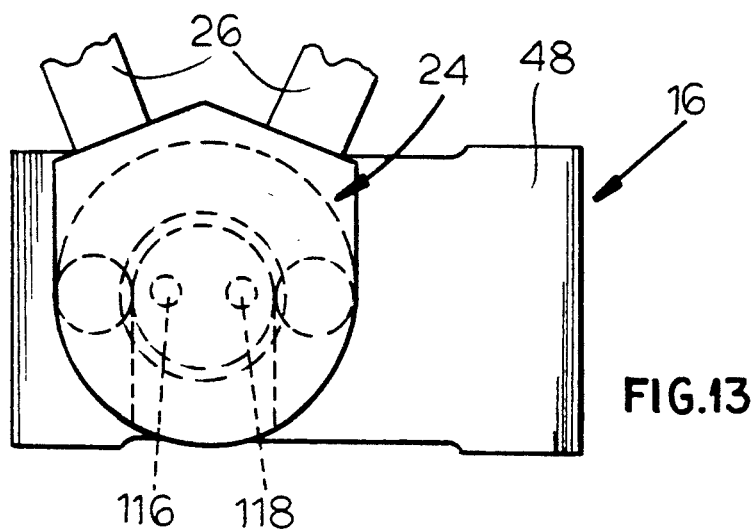
FIG. 13 is a side view of the metering valve with the pressure-meter head attached to it.
Figure 15:
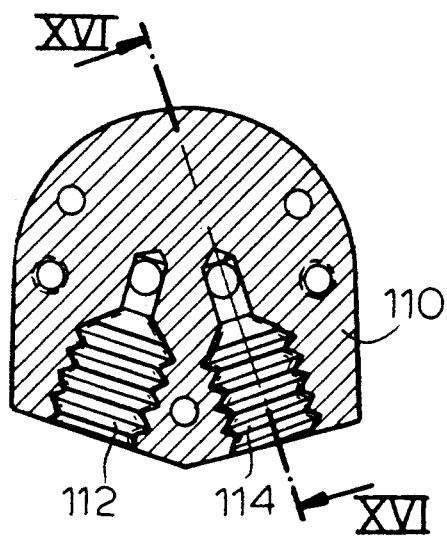
FIG. 15 is a section taken along line XV—XV of FIG. 14.
Figure 14:
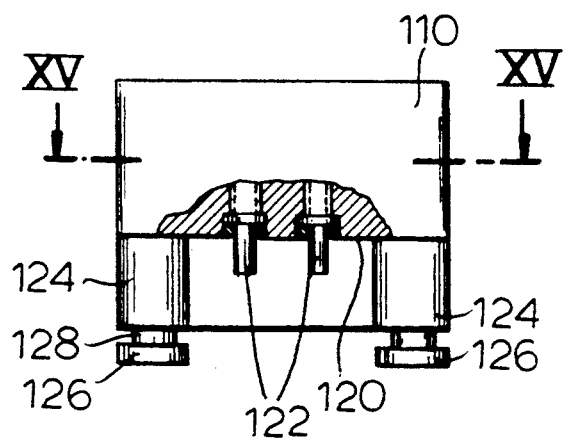
FIG. 14 is a partly sectional side view of the meter head.
Figure 16:
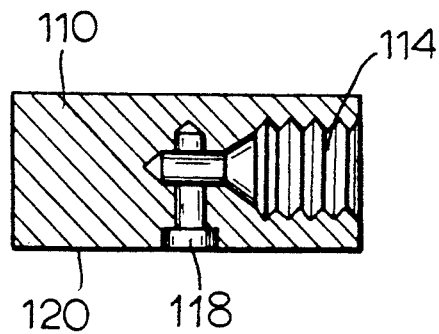
FIG. 16 is a section taken along line XVI—XVI of FIG. 15.

The metering valve 116 shown in FIGS. 6, 7, and 8 has a housing 48 forming the passage 32 and a lever 50 that is connected to the butterfly 30 and that carries a stop 64 like the stop 37. An indexing disk 52 coaxial with the rotation axis of the lever 50 is formed with an arcuate array of, here, five holes 54 through which a screw 56 can be threaded into the housing 48. Each hole 54 is labeled with a respective indicia, here a number 55. In addition the disk 52 has a stop rivet 58 and a stop hole 60 and the lever 50 has a stop screw 62 to lock the handle 50 to the disk 52.

When in its normal use as a metering valve, the chart first is consulted to determine which position will produce a near full-scale reading on the differential pressure meter. The screw 56 is then removed and the hole 54 that corresponds to the desired position is aligned with the hole normally receiving the screw 56. This screw 56 is then inserted through the selected hole, which typically is numbered, and tightened. The lever 50 is pivoted clockwise until it engages the rivet housing or body 48 and the screw 62 is screwed down into the hole 60 so that the valve is locked in this partially open position. Thereafter the technician checks the chart 29 (FIG. 2) that comes with the valve 16 to ascertain what differential pressure must be obtained to get the desired flow rate, and the associated balancing valve 16 is adjusted until the meter 28 shows this pressure, and the balancing valve 16 is locked as described above.

If necessary, the screw 62 can be retracted from the hole 60 to allow the lever 50 to be pivoted back until its stop 64 engages the screw 56 and fully closes the valve. Thus this metering valve can be used as a standard shutoff or isolation valve.

The flow can be both measured and adjusted by the valve 16. In this case the indexing disk 38 is continuously adjustable between 0° and 90°, and is graduated so each position can be identified. The chart 29 in this case carries a large number of position lines associated with the various positions, allowing the differential pressure to be correlated with flow. When the position that produces the desired flow is reached, the screw 56 is tightened.

The pitot assembly 22 shown in FIGS. 9 through 12 has a body 66 that is threaded into a threaded aperture in the valve body 49 and that has extending along an axis A a tubular pitot element 68 subdivided internally by a partition 70 into two passages 72 and 74 opening in opposite directions at ports 76 and 78 at the outer end of the tubular element 68. The opposite ends of these passages 72 and 74 open at respective ports 80 and 82 at a flat face 84 that is formed around each port 80 and 82 with a groove 86 receiving an O-ring 88. The face 84 is formed by a plate 90 formed with two diametrically opposite seats or holes 92 each receiving a respective pin or plug 94 urged outward by a respective spring 96.

The body 66 has an overreaching front edge or rim 98 under which is engaged a circular valve disk 100 formed with two axially throughgoing holes 102 of shape and orientation identical to the two ports 80 and 82. The pins 94 are of stepped diameter with small-diameter outer ends that are complementary to the holes 102 so that these pins 94 can engage in the holes 102 snugly. When thus engaged together, the disk 100 cannot rotate about the axis on the plate 90, but, when the pins 94 are pushed in, the disk 100 can rotate on the plate 90. When rotated through 90°, from the position of FIG. 9, the holes 102 align with the ports 80 and 82.

The pressure-meter head 24 shown in FIGS. 13 through 16 has a two-part body 110 formed with two radially outwardly open ports 112 and 114 opening at their opposite ends axially at adjacent ports 116 and 118 on a projecting flat face 120 of the body 110. The ports 116 and 118 are provided with respective tubular extensions 122 that project sufficiently from the face 120 that, when this face 120 is sitting on the outer end of the assembly 22, the ends of the tubular extensions 122 reach just to the plane of the face 84 of the pitot body disk 90.

In addition the body 110 has two legs 124 each carrying a headed pin 126 spaced to engage around and past the plate 104, with the heads of the pins 126 reaching just past the plate 104 when the face 120 engages the outer end of the rim 98. The notches 106 are positioned such that in the FIG. 9 position of the parts with the pins 94 in the holes 102, when the pins 126 are fitted to the notches 106, the tubes 122 will engage into the holes 102 and will push the lock plugs 94 inward to be flush with the face 84. A subsequent 90° rotation of the body 110 will cause the edge of the plate 104 to engage in grooves 128 in the heads 126 and prevent axial withdrawal of the head 24 away from the pitot assembly 22. At the end of the 90° travel one of the heads 126 will engage the stop formation 108 and the holes 102 will be aligned with the ports 80 and 82, establishing fluid communication between the passages 70 and 72 and the passages 112 and 114 in the body 110.

Thus the head 24 need merely be fitted to the assembly 22 and then rotated through 90° to connect the meter to both orifices 76 and 78 of the pitot 22. The same movement makes the connection and, in effect, opens the valve formed by the disk 100 on the face 84. Similarly, reverse rotation closes this "valve" and allows the head 24 to be separated from the pitot 22.

I claim:

1. A hydronic balancing valve comprising:
   a valve body defining a longitudinally extending flow passage;
   a valve element in the passage movable through a plurality of positions each corresponding to a different flow cross section of the passage, whereby flow is in each position of the valve flow accelerated in zones upstream and downstream of the element in the passage;
   a pitot element mounted on the body and extending into one of the zones of the flow passage and having in the one zone an upstream port directed longitudinally in one direction and a downstream port directed longitudinally in an opposite direction, the pitot element being formed with pitot flow passages opening at the ports and having opposite outlet ends opening at a face of the pitot element; and
   valve means associated with the pilot flow passages for selectively blocking flow from the respective outlet ends, the face being adapted for releasable connection to a differential pressure meter.

2. The hydronic balancing valve defined in claim 1 wherein the valve is a butterfly valve.

3. The hydronic balancing valve defined in claim 1 wherein the valve means includes valve disk formed with two throughgoing holes and displaceable between a closed position covering and blocking flow from the outlet ends of the pilot passages and an open position with the holes aligned with the outlet ends.

4. The hydronic balancing valve defined in claim 3, further comprising:
   locking means for arresting the valve disk in a position with its holes offset from the outlet ends and the valve disk blocking flow from the outlet ends; and
   means on the differential pressure meter for releasing the locking means and permitting the disk to be rotated to a position with its holes aligned with the outlet ends.

5. The hydronic balancing valve defined in claim 4, wherein the locking means includes spring-loaded pins seated in the pitot element and normally projecting into the holes of the valve disk, the release means on the meter including tubular pins engageable into the holes of the disk with the spring-loaded pins to depress same out of the holes and allow rotation of the disk.

6. The hydronic balancing valve defined in claim 4 wherein the pressure meter is provided with a pair of extending headed legs each formed with a groove and the pitot element has a support disk formed with notches through which the headed legs can engage and having an edge engageable in the grooves of the legs when the tubular pins engage the spring-loaded pins.

7. The hydronic balancing valve defined in claim 1, further comprising
   a disk rotationally coupled to the valve element and provided with at least one hole,
   a screw engaged through the hole into the valve body, and
   a stop fixed on the disk and operatively engageable with the valve element to define an end position therefor.

8. The hydronic balancing valve defined in claim 7, wherein the disk is formed with a plurality of such holes angularly spaced from each other and carries adjacent each such hole a respective indicia.

9. The hydronic balancing valve defined in claim 7 wherein the hole is formed arcuately as a slot.

* * * * *